United States Patent [19]

Swanson et al.

[11] Patent Number: 4,839,502
[45] Date of Patent: Jun. 13, 1989

[54] COOKING APPARATUS

[76] Inventors: David L. Swanson, 1670 Lake Largo, Green Bay, Wis. 54301; Gilbert Trick, 888 St. Charles Dr., Green Bay, Wis. 54302

[21] Appl. No.: 170,912

[22] Filed: Mar. 21, 1988

[51] Int. Cl.⁴ .......................... A21B 1/22; F27D 11/00
[52] U.S. Cl. ........................................ 219/401; 99/417; 126/20; 126/21 R; 219/341; 219/399; 219/405; 219/411; 219/462; 426/243
[58] Field of Search .............. 219/400, 401, 405, 409, 219/411, 341, 354, 385, 386, 394, 395, 398, 399, 462; 99/417, 357, DIG. 14; 126/20, 21 R; 426/243, 510

[56] References Cited

U.S. PATENT DOCUMENTS 4,020,323 4/1977 Dills .................................... 219/405
4,481,406 11/1984 Muka ................................... 219/405
4,655,192 4/1987 Jovanovic ........................... 219/401

Primary Examiner—George Yeung
Attorney, Agent, or Firm—Recka, Joannes & Faller

[57] ABSTRACT

An oven that cooks foodstuffs containing water at temperatures up to 600 degrees Fahrenheit with longwave radiation generated by masking a cooking volume from radiant heating elements by blackened rigid inserts, which absorb shortwave and longwave radiation from the heating elements and uniformly reradiate the energy into the cooking volume as longwave radiation; noncondensing steam is injected into the oven until the vapor pressure of the water in the foodstuff attains a pressure at which water will migrate to the surface of the foodstuff to be evaporated; air is then passed through the oven to remove water from the foodstuff, while cooking with longwave radiation continues.

7 Claims, 6 Drawing Sheets

COOKING APPARATUS

BACKGROUND OF THE INVENTION

1. FIELD

This invention relates to cooking ovens, and more specifically, to a novel radiant cooking oven, cooking at higher oven temperatures by long wave radiation, using steam to suppress drying of the product while it is being cooked.

2. 5 DESCRIPTION OF THE RELATED ART

Cooking time in ovens has been reduced by microwave ovens. In a microwave oven, microwaves cook the foodstuff to a desired temperature by exciting the water molecules in a foodstuff. A separate system then browns the foodstuff. Microwave ovens are complicated and can be dangerous. Microwave ovens can produce taste changes in foodstuffs.

Pressurized cookers, using steam, reduce cooking time. Pressurized cookers ar dangerous. Complex lock mechanisms are needed to ensure that the oven stays locked when pressurized. A pressurized oven incorporating a resistance heating element to brown after steam cooking is shown in U.S. Pat. No. 4,430,557.

Convection ovens using steam for processing food, such as shown is U.S. Pat. No. 4,011,805, cook rapidly, as steam condensing on the food transfers a large amount of heat to the food. Steam cookers generate condensate which picks up fat and other cooking debris which must be drained from the oven. The condensate also leaches flavor from the foodstuff and produces a texture to the foodstuff that is not always desirable.

Other devices cook with pressurized fat such as in U.S. Pat. No. 3,608,472. Pressurized fat cooking shortens cooking time, but also adds fat to the foodstuff.

SUMMARY OF THE INVENTION

The invention is designed based on the premise that water absorbs long wave radiation. The foodstuff to be cooked is to a large percentage made up of water.

It is an object of the invention to cook with long wave radiation, at a substantially higher oven temperature than normally used in convection ovens, and while cooking, to suppress evaporation of moisture from the product by inserting non condensing steam into the oven until the internal temperature of the foodstuff is at a desired temperature.

A black body with two sides, a back, a bottom and a top is heated from top and bottom by electric resistance elements, mounted outside of the black body. The black body then emits longwave radiation into a cooking area. The black body absorbs the shortwave and longwave length radiation and reradiates long wave radiation, which is absorbed into the product to be cooked. Long wave radiation penetrates into the foodstuff; shorter wave length radiation tends to bounce off. Cooking temperatures used in the oven are substantially higher than that used in convection ovens, which usually is a range of 300 degrees Fahrenheit to 400 degrees Fahrenheit. The described oven operates at 600 degrees Fahrenheit.

Steam is injected into the oven, during part of the cooking cycle, at a volume low enough so no condensation is formed. The steam suppresses evaporation from the surface of the foodstuff allowing continued penetration of the long wave radiation into the foodstuff to be cooked.

When a desired internal temperature in the foodstuff is reached, the steam is stopped. External air is passed through the oven to remove moisture, by evaporation from the foodstuff. The vapor pressure of the moisture in the heated foodstuff is greater than the vapor pressure of the moisture in the uncooked foodstuff and the increased vapor pressure moves the moisture from the center of the foodstuff to the surface, to be evaporated. By suppressing evaporation until the internal temperature of the product is raised to a desired temperature, a mechanism is created which moves moisture out of the center of the product to the surface to be evaporated.

Further cooking without steam to browning, allows the moisture within the foodstuff to move to the surface of the foodstuff to evaporate and browns the product.

The high temperatures used in the oven cause the oven to be self cleaning.

A catalytic converter mounted in the exhaust, converts smoke and grease to water vapors and carbon dioxide.

The device is vented to prevent pressure build up from injected steam.

DESCRIPTION OF THE PREFERRED EMBODIMENT

Figure 1:
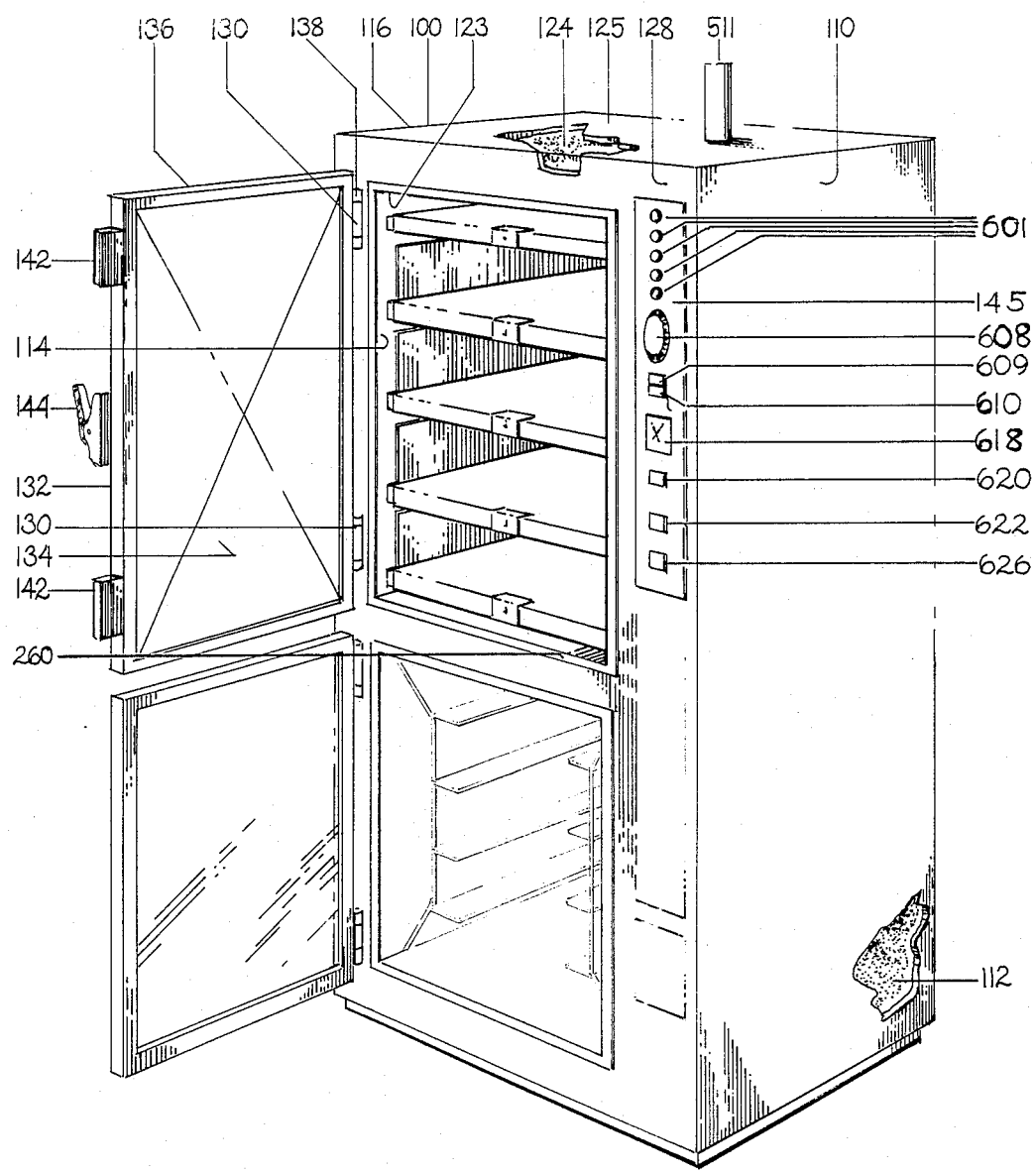
FIG. 1 is a perspective view of the radiant oven of the invention.

The device is comprised of the following elements:

| | |
|---|---|
| insulated cabinet | 100 |
| inside back wall | 102 |
| outside back wall | 104 |
| back wall insulation | 106 |
| right inside side wall | 108 |
| right outside side wall | 110 |
| insulation | 112 |
| left inside wall | 114 |
| left outside wall | 116 |
| left wall insulation | 118 |
| bottom inside wall | 120 |
| bottom outside wall | 122 |
| top inside wall | 123 |
| insulation | 124 |
| top outside wall | 125 |
| oven front | 128 |
| hinges | 130 |
| insulated door | 132 |
| door inside surface | 134 |
| door outside surface | 136 |
| door hinge end | 138 |
| closing magnets | 142 |
| handle | 144 |
| temperature and steam controls | 145 |
| first electrical resistant heating | 202 |

| | |
|---|---|
| element | |
| element spacers | 204 |
| holes for electrical connectors to heat elements | 205 |
| blackened aluminum panel | 206 |
| panel rear support | 208 |
| panel side support | 210 |
| panel front support | 212 |
| second electrical resistance heating element | 214 |
| blackened aluminum panel | 218 |
| panel rear support | 220 |
| panel side support | 222 |
| panel front support | 224 |
| lip on side supports | 225 |
| first cooking deck | 226 |
| third electrical resistance heating element | 228 |
| blackened aluminum panel | 232 |
| panel rear support | 234 |
| panel side support | 236 |
| panel front support | 238 |
| second cooking deck | 240 |
| fourth electric heating element | 242 |
| blackened aluminum panel | 246 |
| panel rear support | 248 |
| panel side support | 250 |
| panel front support | 252 |
| third cooking deck | 254 |
| fifth electric heating element | 256 |
| reflector sheet | 260 |
| black body cooking inserts | 300 |
| four deck oven [whole insert] bottom of insert | 302 |
| right side wall of insert | 304 |
| left side wall of insert | 306 |
| back wall of insert | 308 |
| downward extending lip of insert | 310 |
| insert retainer | 311 |
| back wall spacing | 312 |
| right side wall spacing | 314 |
| left side wall spacing | 316 |
| spacing between lip of insert and plate | 318 |
| air blocking flange for thermocouple | 320 |
| steam and air circulating space between top of insert side walls and radiant heat plate | 324 |
| first black body insert | 326 |
| enclosure of heating element between black body insert and blackened plate | 332 |
| second black body insert | 334 |
| third black body insert | 336 |
| fourth black body insert | 338 |
| steam injection system | 400 |
| incoming water | 404 |
| water entry solenoid | 410 |
| steam chamber | 412 |
| steam manifold | 422 |
| electrical heating element for steam | 424 |
| pressure equalizer | 428 |
| steam injector nozzles one to each deck | 430, 432, 434, 436 |
| Stack system | 500 |
| channel vent formed in right side wall | 502 |
| solenoid | 506 |
| opening in top of oven | 508 |
| catalytic screen | 510 |
| exhaust | 511 |
| channel vent formed in left side wall | 512 |
| opening for air in bottom of left channel | 514 |
| electrical control system | 600 |
| energize lights | 601 |
| thermocouple | 602 |
| thermocouple attachment to insert | 603 |
| thermocouple attachment to top plate | 604 |
| protector plate | 605 |
| temperature switch for oven heat | 608 |
| ready light | 609 |
| timing light | 610 |
| oven timer | 618 |
| on/off switch | 620 |
| cycle switch | 622 |
| steam section timer and on/off switch | 626 |

Referring to the drawings, FIG. 1 shows a cabinet containing a radiant heated oven and a warmer. The oven is on the top and the warmer is on the bottom.

Figure 2:
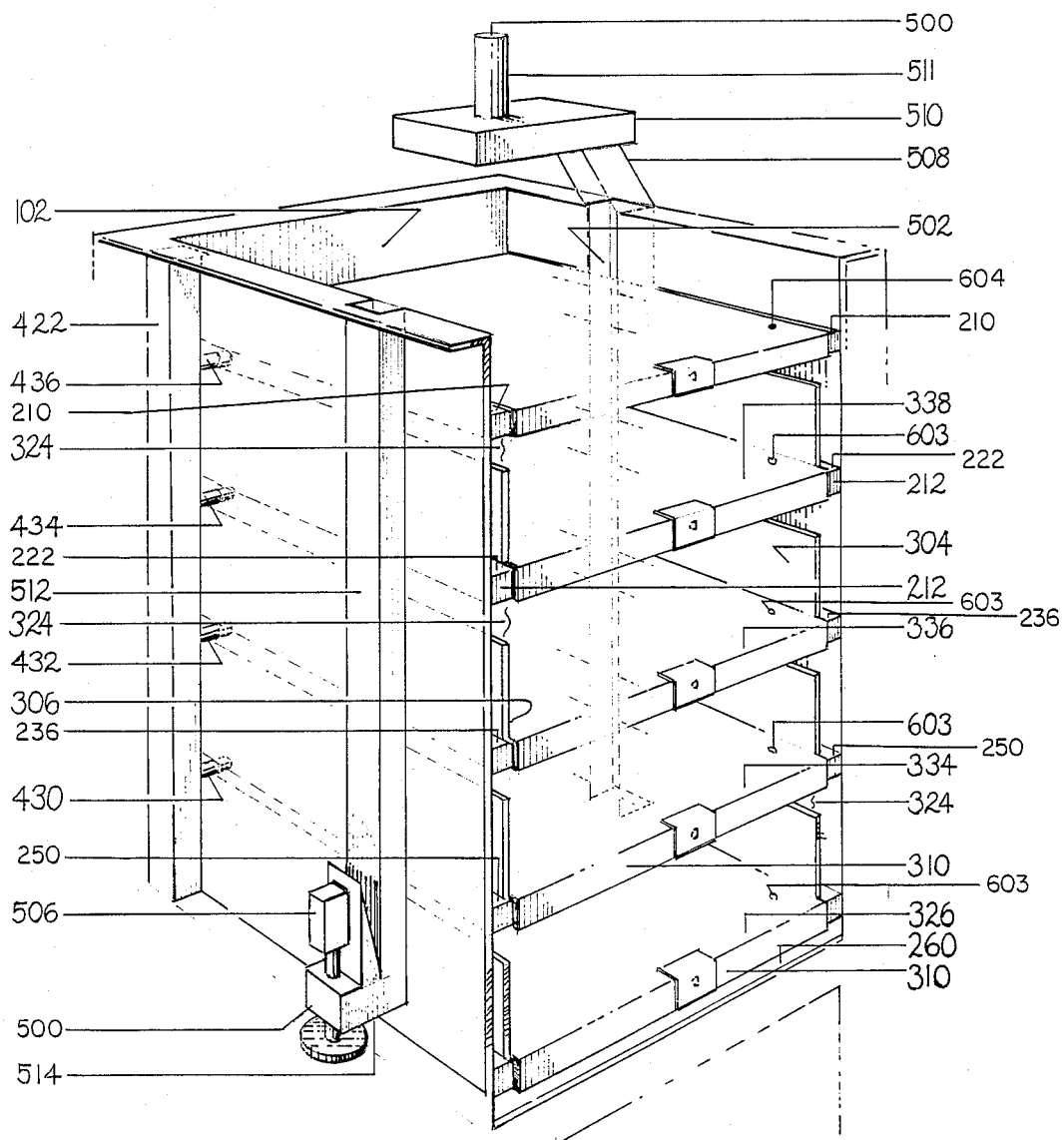
FIG. 2 is a view of a four deck oven, with the outer cabinet and insulation removed.
Figure 3:
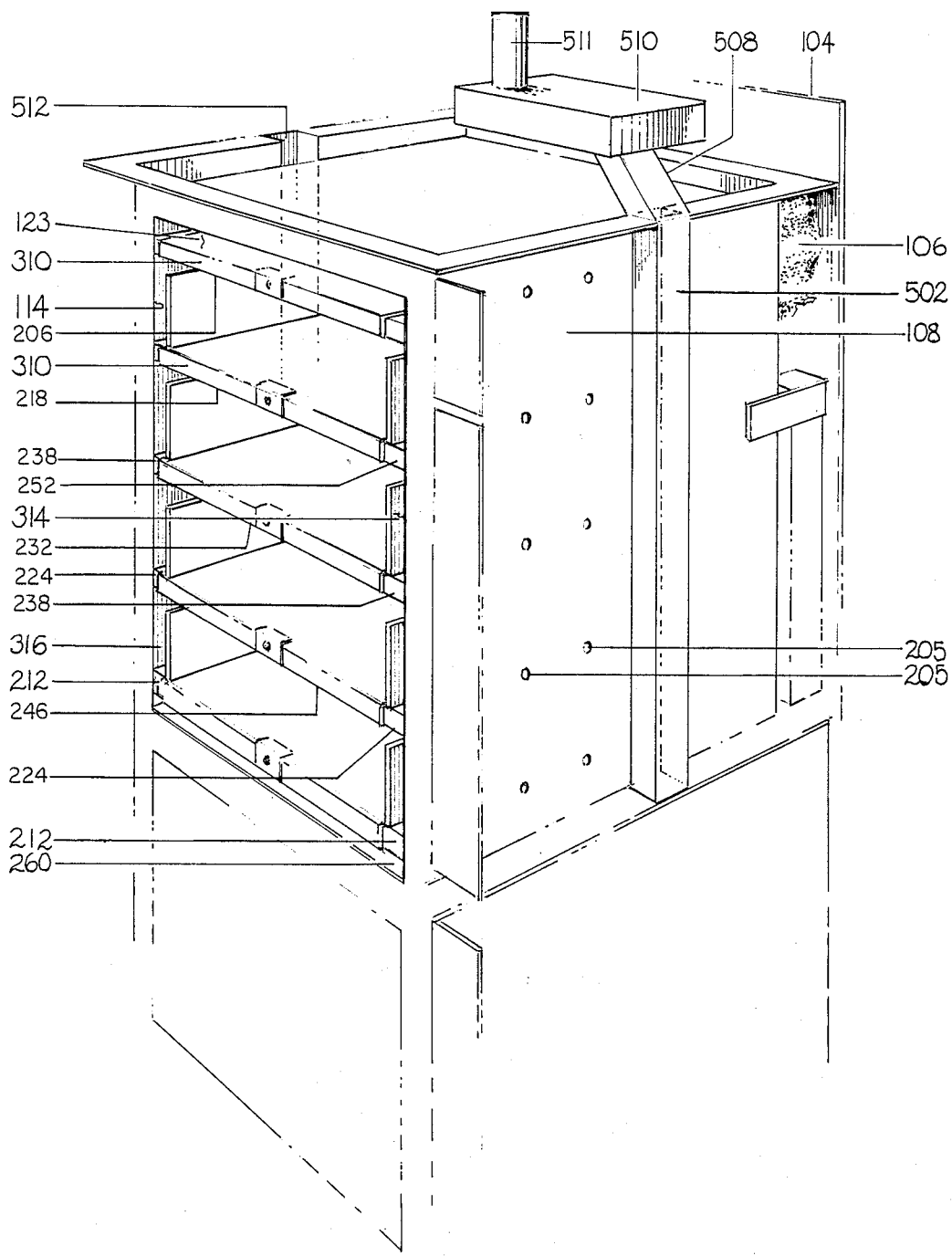
FIG. 3 is a disassembled perspective view, of the invention, with the outer cabinet and insulation removed.

The insulated cabinet 100 comprises a top, front, back, side walls, bottom and a door. As best seen in FIGS. 1, 2 and 3, between the inside back wall 102 and the outside back wall 104 is insulation 106. Between right inside wall 108, and right outside wall 110, is insulation 112. Between the inside left wall 114, and the outside left wall 116, is insulation. Between the top inner wall 123, and top outside wall 125 is insulation 124. The bottom is also insulated. The inside side walls 108, and 114, inside back wall 102, top 123, and inside bottom wall 120, and the door 132 form the oven.

The inside of the oven is formed as a reflector liner. That is the inside walls, top and bottom are formed of aluminized steel. The reflector liner reflects radiation. Steel is a poor heat conductor and retains heat within the oven. The oven front 128, is closed by insulated door 132, mounted on hinges 130, and retained closed by magnets 142. A handle 144, is mounted on the outside of door 132.

To the right of the door are mounted oven temperature and steam controls 145.

Figure 4:
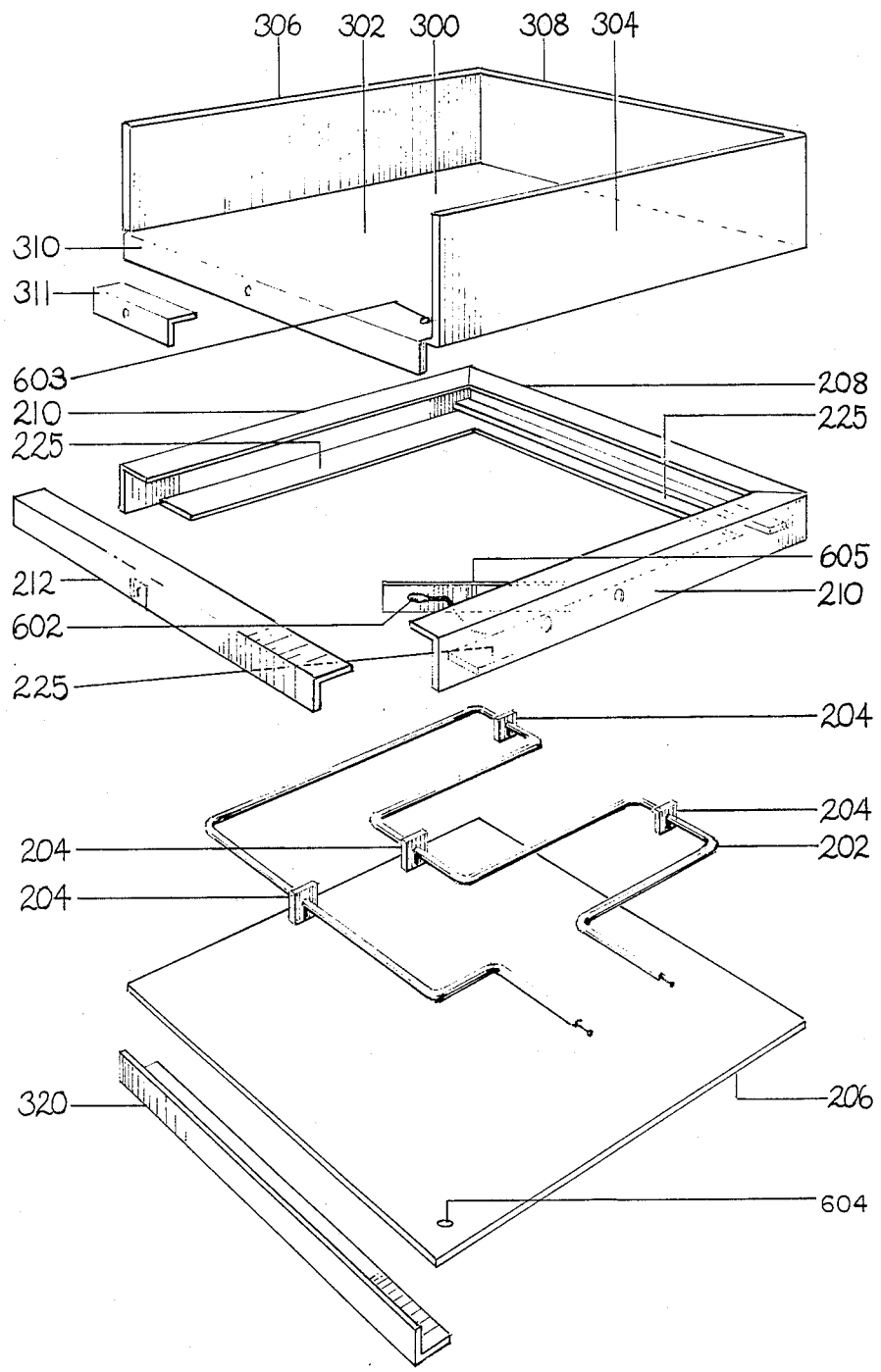
FIG. 4 is a disassembly view showing a disassembled cooking deck.

Within the oven space formed by the cabinet inside side walls, back, top and bottom and the door are mounted four cooking decks. Attached to inside walls 108, 114, and the inside back wall 102 are panel side supports, 210, 222, 236, and 250. Attached to the inside back of the cabinet are rear supports 208, 220, 234, and 248. Extending across the front of the oven space are panel front supports 212, 224, 238, and 252. These are best seen in FIG. 4 and in FIG. 5.

The supports are used to bear the weight of black anodized aluminum panels 206, 218, 232 and 246. After the front, back and side supports are affixed to the sides and back of the oven, the black anodized panels are slid onto a lip type support 225 as can be seen in FIG. 4. Electrical resistance heating elements 202, 214, 228, 242, and 256 are placed at a distance from the aluminum panels. The electrical connectors for the heating elements pass through inside wall 108, to be connected to a power source, as can best be seen in FIG. 3 and 4. Spacers 204 hold the heating elements slightly above the surface of the blackened panel. The heating element is held centered in the space between the aluminum panels by the spacers 204. A section through a single deck, FIG. 5, best shows the location and spacing of the heating element. A deck is defined as the space between a top panel and the bottom insert, into which is placed the foodstuff to be cooked.

There are 5 electrical heating elements in a 4 deck oven. With such a configuration, each deck has a heating element at top and bottom. The holes in the sidewalls 205, through which the heating elements are connected to a power source, can best be seen in FIG. 3.

Reflector sheet 260, made of stainless steel, forms the bottom of the cabinet, and is mounted below the bottom deck, supporting heating element 256, which radiates heat upward. Stainless is used for the bottom of the oven because of its relatively poor heat transfer characteristics, to retain heat in the oven.

Within each deck formed by the spaced apart panels 206, 218, 232, and 246, are inserted black body cooking inserts 300. A single insert is best seen in FIG. 4.

The inserts are formed of textured black anodized aluminum panel. A bottom 302, a right side wall 304, a left side wall 306 and a back wall 308 form the insert. Heat from the heating elements mounted between the inserts and the blackened panels passes through the aluminum up the side walls and up the back wall 304, 306 and 308. A downward extending lip 310 extends downward from the insert 300 blocking and absorbing radiation from the heating element which would otherwise be radiated outward towards the oven door; the heating element is located between insert 300 and the blackened aluminum panel mounted below the insert. Lip 310, ensures that the radiation from the electrical resistance heating element impinges on the black body insert rather than radiates out of the space between the insert and the panel below the insert. This lip keeps the front door cooler and captures otherwise wasted radiant energy. A retainer 311 is bolted through lip 310, to front support 212, to fasten the insert into the oven.

Figure 5:
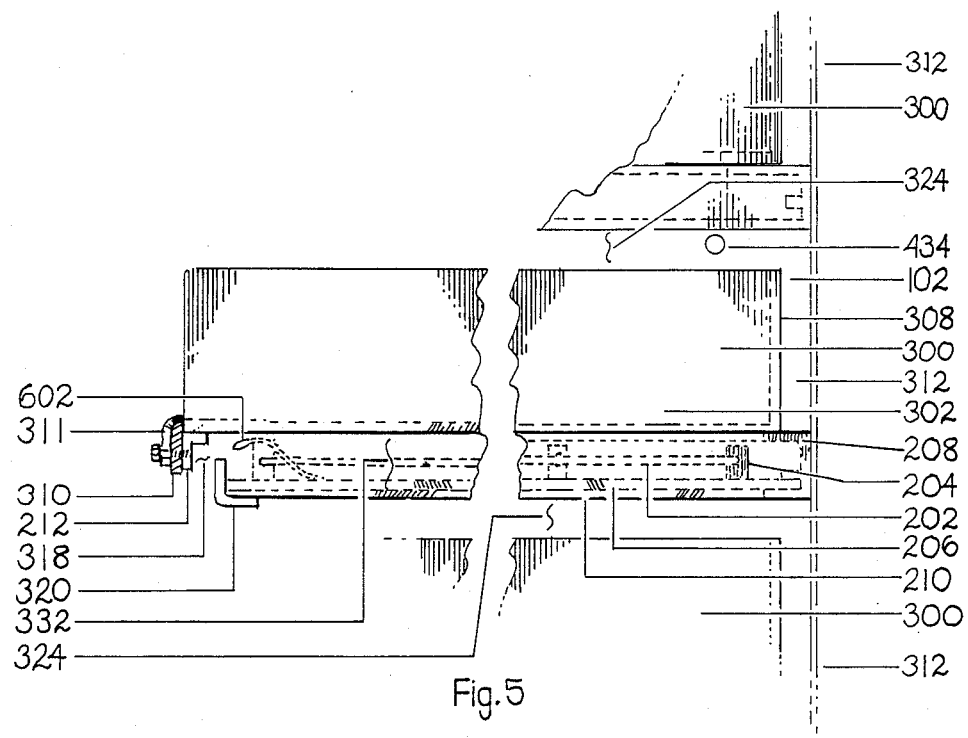
FIG. 5 is section view through the side of the oven, showing the construction of a complete deck.
Figure 9:
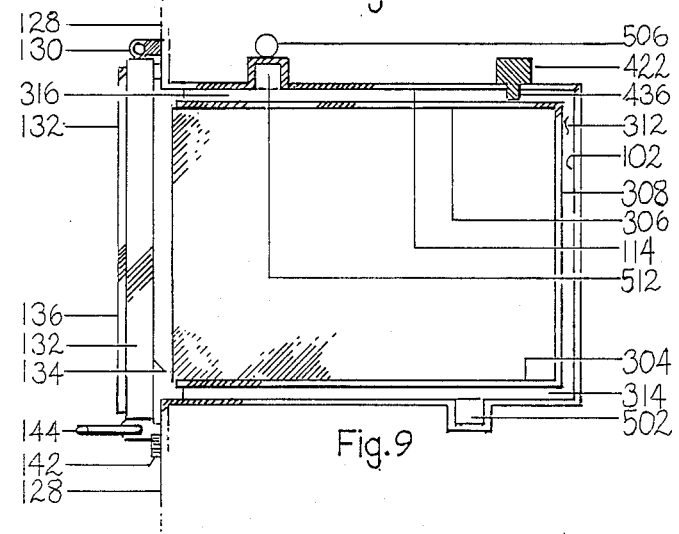
FIG. 9 is a top view, in section, showing the stack and steam injection.

Insert 300 is spaced away from the back wall, forming spacing 312 as best seen in FIG. 5. The right side wall of the insert is spaced away from the oven liner, forming spacing 314, and is spaced away from the left side wall 316. The spacing of the inserts from the side walls, as best seen in FIG. 9, is to prevent contact of the insert with the inside walls of the oven, to lessen heat transfer to the outside walls.

A slot exists between lip 310, of insert 300 and the bottom plate, that slot is 318, and can be best seen in FIG. 5. The slot allows air to circulate into the heating element enclosure, where a thermocouple sensor is located. When door 132 is opened, air enters the oven and into the heating element enclosure, through the slot, cooling down the deck and the sensor. The slot allows outside air to enter, cycling the heat on quicker than if the air impinged only on the deck. Admitting air into the enclosure when the oven is loaded and unloaded, provides faster oven response to temperature changes.

Side walls 304 and 306 of the cooking insert are shorter than the distance from top to bottom of a deck. This leaves an open area slightly below the upper radiant heat panel, forming steam and air circulating space 324, as best seen in FIGS. 2, 5, 7 and 8. The space formed on both sides of the oven at each deck, is used to pass steam or air across the foodstuff cooked within each insert, to maintain or to remove moisture from the cooking foodstuff.

The top of the same back, side and front supports 210 et. al. that support the blackened panels 206 et. al. also support the insert 300. In a four deck oven there would be four inserts 326, 334, 336 and 338.

An enclosure 332 is formed by the black body inserts and the blackened panels. Within this enclosure is mounted the radiant heat elements and is best seen in FIG. 5.

Energy radiated from each electrical heating element, which radiates both long and short wave radiation, impinges on the blackened panel, and on the blackened insert 300, and is reradiated, uniformly, through the blackened aluminum panel and insert, as long wave length radiation onto the foodstuff contained within.

FIGS. 2, 5, 6, 7 and 9 show the steam injection system 400. At each deck, a single steam injector nozzle 430, 432, 434 and 436 is mounted. A jet of steam is injected out of a single hole in the nozzle. The direction of steam injection is parallel to the cooking deck and towards the door 134, of the oven.

The steam sweeps across the oven, within the insert and is exhausted from the oven at a vent channel 502 located at the rear of the opposite side of the oven. This direction of steam injection causes the steam to make a 180 degree turn across the cooking area of the black body insert 300, prior to being vented.

Figure 6:
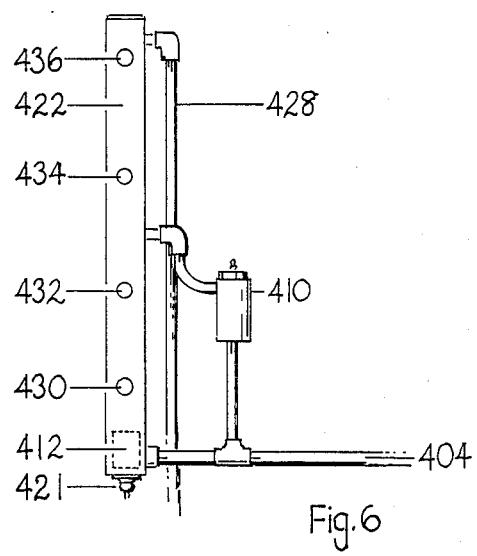
FIG. 6 is a view of the steam generating system.

Steam is produced in a steam chamber 412, as best seen in FIG. 6. Incoming water 404 is piped to a steam chamber 412. An immersion heating element of 2000 watts maintains the water in the steam chamber at 180 degrees, by heating the water intermittently, as controlled by a thermal probe. A float switch calls for water, and turns the power to the steam chamber on continuously, when steam is called for by the steam controller. A low water cutoff shuts the steamer off if there is not enough water in the chamber. Steam is generated at from 214 to 216 degrees Fahrenheit, and is fed into steam manifold 422. The injectors 430, 432, 434, and 436 are connected directly to the manifold.

Figure 7:
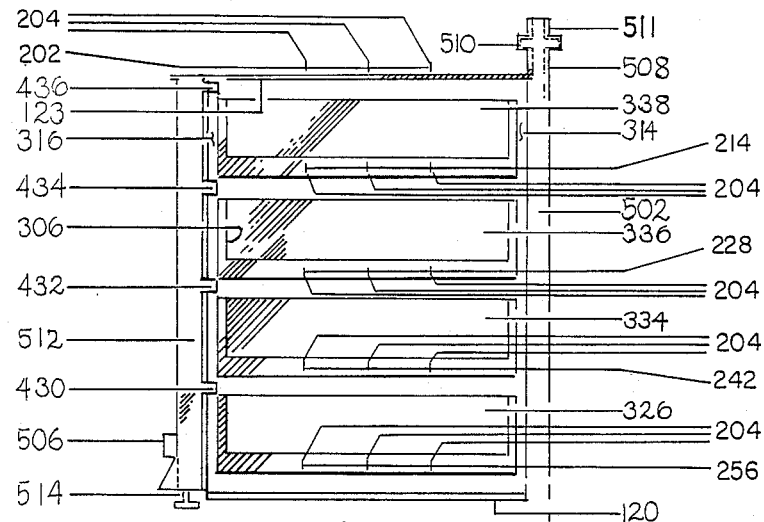
FIG. 7 is a section through the front of the oven showing air and steam passage through the oven.

A stack system 500 shown in FIG. 7 is used to control steam and air movement through the oven.

Figure 8:
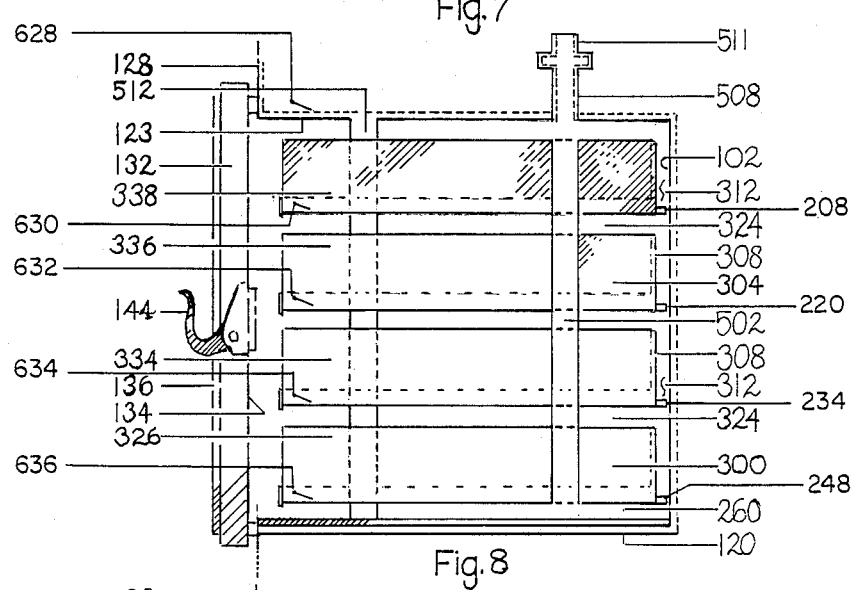
FIG. 8 is a side view, in section, showing the stack and the decks in a complete oven.

The stack system is best seen in FIGS. 7, 8, and 9.

A channel vent 502, which is always open, is formed in the right inside wall 108 of the oven. The channel is located at the back of the oven. The channel vent 502 runs from the bottom insert to the top of the open. At the top of the oven, above the channel is an opening 508, leading into a 660 watt heating element which preheats the exhaust; the exhaust is then passed through catalytic screen 510, which burns off debris and smoke passing up the channel.

As steam is injected into the oven at about 214 to 216 degrees Fahrenheit, the steam expands in the 600 degree Fahrenheit oven, sweeps across and around each inset 300 containing foodstuffs, and out channel 502, to be exhausted. The open channel prevents pressure build up from the steam.

To exhaust the steam, and to rapidly evaporate the moisture in the oven, a second channel vent 512, is provided. This channel vent is formed in left oven wall 114. Channel vent 512 is located at a position in the oven diagonally opposite to channel vent 502.

Channel vent 512 opens into the oven at a point below space 324; space 324 is located between the top of the insert and the surface of a blackened aluminum plate.

Channel vent 512 is kept closed when steam is injected. When steam injection stops, solenoid 506 is denergized, which opens channel vent 512 to outside air. FIG. 2 shows the solenoid denergized and open. A stack comprising channel vent 512, spacing 324 and channel vent 502 allows outside air to sweep diagonally across the inserts 300, carrying away evaporated moisture from the foodstuffs being cooked in the insert, as can best be seen in FIG. 7.

A fan can be used to force outside air through the oven. In the best method, air flow is controlled by the size of the channel vents formed in the oven walls, rather than by a fan.

The oven temperature and steam controls 145 as best seen in FIGS. 1 and 3, include, starting at the top, five energize lights 601, which note which deck is then drawing current; below the lights 601 is temperature setting switch 608; below that is a ready light 609 and a timing light 610; the ready light goes on when the decks have attained cooking temperature; the timing light alerts the user that the oven is cooking, while it is cooking; a timer 618, is mounted below the time light to set total cooking time; below 618 is mounted an on/off switch 620; below 620 is a cycle start and restart switch 622; below 622 is the steam injection control 626, including a 30 minute adjustable timer and a power switch.

Thermocouple 628 is mounted in the top plate at 604, thermocouples 630, 632, 634, and 636 are attached to the bottoms of each insert at 603 as best seen in FIGS. 2 and 4.

A thermocouple is attached to each deck. The temperature setting potentiometer on the side of the oven front as seen in FIGS. 1 and 3 controls power to all the heating elements. When the temperature is below the required temperature, the heating element on that deck is energized.

When steam is desired, the steam timer 626 is set and runs during the cooking cycle. Only when power is supplied to the steam generator, is power supplied to the solenoid 506, which closes vent 512. When steam is on, vent 512 is closed by solenoid 506.

BEST METHOD

An object of the invention is to decrease cooking time of a product to be cooked in an oven at a point of purchase location, or in an institutional setting such as hospitals, schools, military bases, etc. A point of purchase location is a delicatessen or a fast food restaurant.

Cooking is done by radiant heating, at a substantially higher oven temperature than is normally used, 600 degrees Fahrenheit, in a radiant heated hot deck oven in which is mounted a blackened cooking insert.

Increase in cooking speed was obtained by increasing oven temperature, in a black body oven. The maximum temperature to tested was to be 900 degrees Fahrenheit, which is close to the slump temperature of aluminum. Steam was to be injected to keep the surface of the foodstuff to be cooked, open to penetration of long wave length radiation. Because of the higher vapor pressure of water at higher temperatures, evaporation of excess moisture, it was theorized, would occur quickly when the steam was stopped.

Aluminum was chosen as the black body material because of the relatively high heat transmission of aluminum. Other materials such as blackened steel have very poor heat transfer properties.

Within a testing temperature range to 900 degrees Fahrenheit, the object of the invention was to maximize long wave length radiation.

Temperatures above approximately 900 degrees Fahrenheit are not efficient in transferring energy to food because the wave lengths reflect off rather than penetrate water and water vapor.

See Mark's Standard Handbook for Mechanical Engineers, Eighth Edition, Page 4-72 printed by Kingsport Press, Inc.

Long wave length radiation passes through water and water vapor. Short wave length radiation bounces off water and water vapor. Cooking was to be done with long wave radiation analogous to microwave cooking; that is in obtaining penetration of water by longwave heating radiation without the complexity of microwaves. Testing has been done through 600 degrees Fahrenheit and continues. No other device cooks foodstuffs at this high a temperature.

A resistance heating element is an open filament, encased in a sheath. The filament heats up and reaches temperatures approaching 1800 degrees Fahrenheit. Resistance heating elements were used to heat the oven. Gas can also be used. A gas flame emits short and long-wave radiation.

By enveloping the heating elements between two black bodies made of a material with good heat transfer properties, shorter wave length radiation generated by the heating elements is converted to long wave length radiation which is transmitted through the blackbodys into the cooking area.

A black body is the ideal radiator. The characteristic properties of a black body are that it absorbs all the radiation incident on its surface and the quality and intensity of the radiation it emits are completely determined by its temperature. Marks p. 4-71.

The intensity of radiation from a black surface is independent of angle of emission.

Uniform temperature is generated across the black body because of the excellent energy transfer characteristics of aluminum and because of a black body's attribute of radiating and reradiating to maintain a uniform temperature across a black body.

To maximize long wave length radiation, a blackened, roughened aluminum insert is used. Darker surfaces radiate more energy than lighter surfaces or shiny surfaces. A roughened textured surface radiates more energy than a smooth one.

As stated, a black body has another useful property. Radiation and reradiation causes all surfaces of a black body to approximate the same temperature eliminating local hot spots.

Cooking of foodstuffs was to be done in a theoretical enclosed black body cube. All surfaces of the foodstuff would then receive uniform radiation and heating.

To maximize long wave length radiation, a 2000 watt electric heated resistance element was placed above a blackened aluminum sheet, above the cooking area, and another 2000 watt electric heated resistance element was placed below a blackened aluminum insert. Cooking was done in the volume formed between the blackened sheet and the blackened insert. That volume is the cooking deck.

The aluminum surfaces were anodized coated with a hard black anodized coating, to as closely as possible make the aluminum radiating surface a black body.

Testing was first done with chicken, as being the most difficult to cook. Because of the varying sizes of chicken pieces, the delicateness of chicken skin and the chicken bone, it is a difficult foodstuff to cook. At higher temperatures, chicken burns before a cooked temperature is attained at the bone. The normal temperature at which chicken is cooked is 325 degrees Fahrenheit. Testing has been done to 600 degrees Fahrenheit; a temperature which would normally incinerate chicken.

The sides and bottom of the blackened aluminum insert were raised above the height of the foodstuff to be cooked, to radiate heat from the sides of the insert towards the foodstuffs, in this case chicken.

To maintain the moisture level of the chicken, so long wave length radiation could penetrate the chicken, moisture in the form of steam was injected into the oven. Without steam, an unpenetrable surface forms on the chicken, and the outside quickly burns before the required internal temperature is reached.

The chicken pieces inserted in the oven were 40 degrees Fahrenheit when inserted into the 600 degree Fahrenheit oven. The vapor pressure of water in millimeters of Mercury at 40 degrees Fahrenheit is 5 mm. In an oven at 600 degrees Fahrenheit, the vapor pressure of water is 8029 mm of Hg. What this means in cooking, is that unless evaporation is suppressed, a hard dry burned coat forms on the chicken and the outside is incinerated before the inside is cooked.

By suppressing evaporation of moisture until an internal temperature of 165 degrees Fahrenheit is reached, the vapor pressure of moisture in the center of the chicken is raised to 290 mm of Mercury. The vapor pressure increases by 50 times. Under that internal vapor pressure, the moisture in the chicken will migrate to the surface of the chicken to be evaporated.

A vent extending up the side of the oven normal to each deck was formed to allow the entering steam to exhaust. The steam injected is enough to only saturate the air in the oven. A ball bearing size drop of moisture will remain in the oven for about 8 minutes of a steam cycle of 10 minutes. No condensation of the steam on the chicken occurs. Condensation on the chicken causes flavors to change. The condensate with entrained fat and debris must also be removed, complicating the oven.

Preliminary testing, in the project to decrease cooking time, from 375 degrees Fahrenheit through 600 degrees Fahrenheit showed that the required product internal temperature could be obtained by cooking at 600 degrees Fahrenheit for 10 minutes with injected steam and then 10 minutes without steam. The preliminary test produced a product that would not brown and was too wet from internal moisture.

A second vent was then installed, creating an exhaust stack for the moisture escaping from the chicken to be exhausted. The oven with the two vents forming an exhaust stack cooked and browned chicken in 20 minutes.

In testing, cooking at 600 degrees Fahrenheit oven temperature for 10 minutes with steam, raised the internal temperature of the chicken from 40 degrees Fahrenheit when inserted, to 160 degrees Fahrenheit. A further 8 minutes with no steam raised the temperature to 195 degrees Fahrenheit.

Subsequent testing with products less difficult to cook showed products as disparate as pork, cod, turkey breast, steak and vegetables could be cooked successfully with the system.

Plate of three sixteenths aluminum plate is formed to shape, sandblasted and then hard coat black anodized. The insert as shown in the drawings with a bottom, back, sides and overhanging lip is formed of the same material, which is then hard coat black anodized. Sandblasting is to a 2 mil profile to increase surface area. The inside width of the oven is 16 inches, the depth is 19 inches. The trays containing the foodstuff to be cooked are 13 inches wide by 18 inches deep.

Because the device cycles repeatedly through a cooking cycle, being reloaded after each finished cycle, heavy aluminum sheet was used.

The weight of the black body insert is 11 lbs and the aluminum top panel is 5.6 lbs. A load of chicken on each deck would weigh approximately 5 lbs. The retained calories held by the insert and blackened aluminum panel over sheet prevent any major temperature drop when the oven is reloaded.

The heating elements used are two kilowatt resistant heating elements. Five of them are used.

The oven is vented at all times to the outside through a 660 watt heater and catalytic screen to reduce smoke and entrained cooking debris to water vapor and carbon dioxide. Venting to the outside prevents pressure build up within the oven.

The steam manifold is made of two inch square stainless tubing, four feet long. A heating element is vertically inserted into the steam generator to boil the water to make steam. Four steam nozzles are mounted to vent steam into the cooking insert located at each deck. In the tested model, steam is generated at two kilowatts generating 6.8 pounds per hour of steam for the time period required.

At the end of the steam cycle, moisture is vented from the system.

In the prototype, the wall height of the insert which is less than the height of the deck, measured from the bottom of the insert to the upper blackened plate, forms part of an exhaust vent across the deck.

To complete the vent, a generally closed four square inch vent, 28 inches long is opened by denergizing a solenoid. Outside air entering the oven through the vent sweeps across the insert, and out the continuously open steam exhaust vent, removing moisture, while radiant energy continues to impinge on the foodstuff being cooked.

Venting is set by a timer. The timer time is set experimentally. When the internal temperature of chicken reaches 165 degrees Fahrenheit, the exhaust vent is opened. The chicken internal temperature continues to rise to 190 degrees Fahrenheit, with further cooking without steam, which is the desired internal temperature.

The mobility of the moisture within the chicken, as determined by its vapor pressure, at 165 degrees Fahrenheit is 50 times higher than it is when the chicken is put in the oven at about 40 degrees Fahrenheit.

As the steam is stopped, moisture within the chicken migrates through the chicken to the outside of the chicken and then evaporates quickly from the chicken. As stated, the permeability of the chicken to moisture is greater at higher temperatures than at lower temperatures because of the exponential increase in vapor pressure as temperature increases.

I claim:

1. A cooking oven in operative combination, comprising:

A top, bottom, rear, oppositely disposed side walls and a door defining an enclosure;

a cooking deck mounted within the enclosure;

a first heating element, mounted within the enclosure, operative to radiate longwave length and shortwave length radiation, when energized;

a first black body, having a top surface and a bottom surface, mounted within the enclosure, below the first heating element, said black body being operative to absorb longwave and shortwave radiation, from the heating element, through the black body's top surface, and to reradiate longwave length radiation uniformly through the black body's bottom surface; the bottom surface of the first black body defining the top of the cooking deck;

a second black body, mounted within the enclosure, below the first black body, having a top surface and a bottom surface; the top surface of the second black body defining the bottom of the cooking deck;

a second heating element, mounted within the enclosure, below the second black body, operative to radiate longwave and shortwave radiation, when energized, to be absorbed by the second black body, through the bottom surface of the second black body, to be reradiated uniformly through the top surface of the second black body as longwave length radiation;

temperature regulating means operable to vary the energy supplied to the heating elements;

a foodstuff to be cooked within the cooking deck, such foodstuff containing water;

injection means operative to insert steam into the cooking deck, during at least part of a cooking cycle, the volume of steam being selectable to provide enough moisture to suppress evaporation of water from the foodstuff, without condensation of the steam, until the vapor pressure of the water in the foodstuff attains a desired level;

a first vent operative to vent steam out of the enclosure;

a second vent operative to allow air to pass through the enclosure, during at least part of a cooking cycle.

2. A cooking oven comprising:

An insulated top, bottom, rear, oppositely disposed side walls and an insulated door defining an enclosure;

a cooking deck mounted within the enclosure;

a first resistance heating element, mounted within the enclosure, comprising an open filament encased in a sheath, operative when energized to radiate longwave and shortwave radiation;

a blackened rigid sheet made of a material having a property of high conductance to heat, having a top surface and a bottom surface, mounted within the enclosure, below the first resistance heating element, said blackened rigid sheet being operative to absorb longwave and shortwave radiation through its top surface, to reradiate longwave radiation uniformly through its bottom surface; the bottom surface of the blackened rigid sheet defining the top of the cooking deck;

a bottom, upstanding side walls, and an upstanding back, defining an insert, such insert being made of a blackened rigid material having a property of high conductance of heat; said insert mounted below the blackened rigid sheet, within the enclosure, the bottom of the insert defining the bottom of the cooking deck;

a second resistance heating element, mounted within the enclosure, below the blackened rigid insert, comprising an open filament encased in a sheath, operative when energized, to radiate longwave and shortwave radiation, to be absorbed by the blackened rigid insert, to be reradiated uniformly by the insert as longwave radiation;

temperature regulating means operative to vary the energy supplied to the resistance heating elements;

a foodstuff to be cooked within the cooking deck, such foodstuff containing water;

injection means to insert steam into the cooking deck, during at least part of a cooking cycle, the volume of steam being selectable to provide enough moisture to suppress evaporation of water from the foodstuff, without condensation of the steam, until the vapor pressure of the water in the foodstuff attains a desired level;

a first vent operative to vent steam out of the enclosure;

a second vent operative to allow air to pass through the enclosure, during at least part of a cooking cycle.

3. The cooking oven in claim 2 wherein the blackened rigid sheet and the insert are made of aluminum.

4. The cooking oven in claim 2 wherein the height of the upstanding walls of the insert, exceed the height of the foodstuff inserted in the cooking deck.

5. The cooking oven in claim 2 wherein the weight of the blackened rigid sheet and of the insert exceeds the weight of the foodstuff to be cooked.

6. The cooking oven in claim 2 further comprising an oven liner made of a reflective material having a property of low conductance of heat.

7. In a cooking oven of the type in which heating elements in an insulated enclosure are used to cook a foodstuff containing water, wherein the improvement comprises means defining a radiant heat source for generating longwave and shortwave radiation selectable to attain an internal enclosure temperature up to 600 degrees Fahrenheit;

an element made of a blackened material having a property of high conductance of heat mounted between the heat source and the foodstuff to be cooked operative to absorb longwave and shortwave radiation to uniformly reradiate longwave radiation;

steam injection means for injecting steam into the enclosure to suppress evaporation of water from the foodstuff, until the vapor pressure of the water within the foodstuff attains a desired level;

a first vent means operative to vent steam out of the enclosure to prevent pressure buildup;

a second vent means operative to vent air through the enclosure, during part of a cooking cycle, to evaporate water from the foodstuff when the vapor pressure of the water in the foodstuff attains a desired level, and to carry the water out of the enclosure.

* * * * *